United States Patent
Hermans et al.

(10) Patent No.: US 11,434,882 B2
(45) Date of Patent: Sep. 6, 2022

(54) DEVICE AND METHOD FOR CIRCULATING LIQUIDS

(71) Applicants: UNIVERSITÉ DE STRASBOURG, Strasbourg (FR); CENTRE NATIONAL DE LA RECHERCHE SCIENTIFIQUE, Paris (FR);
(Continued)

(72) Inventors: Thomas Hermans, Strasbourg (FR); John Michael David Coey, Dublin (IE); Peter Dunne, Strasbourg (FR); Bernard Doudin, Strasbourg (FR)

(73) Assignees: UNIVERSITÉ DE STRASBOURG, Strasbourg (FR); CENTRE NATIONAL DE LA RECHERCHE SCIENTIFIQUE, Paris (FR); THE PROVOST, FELLOWS, FOUNDATION SCHOLARS, AND THE OTHER MEMBERS OF BOARD, OF THE COLLEGE OF THE HOLY AND UNDIVIDED TRINITY OF QUEEN ELIZABETH COLLEGE GREEN, Dublin (IE)

( * ) Notice: Subject to any disclaimer, the term of this patent is extended or adjusted under 35 U.S.C. 154(b) by 406 days.

(21) Appl. No.: 16/479,788

(22) PCT Filed: Jan. 19, 2018

(86) PCT No.: PCT/EP2018/051325
§ 371 (c)(1),
(2) Date: Jul. 22, 2019

(87) PCT Pub. No.: WO2018/134360
PCT Pub. Date: Jul. 26, 2018

(65) Prior Publication Data
US 2021/0332815 A1 Oct. 28, 2021

(30) Foreign Application Priority Data

Jan. 23, 2017 (EP) .................................. 17305070

(51) Int. Cl.
*F04B 17/00* (2006.01)
*F04B 43/10* (2006.01)
(Continued)

(52) U.S. Cl.
CPC .............. *F04B 17/00* (2013.01); *F04B 43/10* (2013.01); *F04B 43/12* (2013.01); *F04B 49/06* (2013.01); *H02K 44/00* (2013.01)

(58) Field of Classification Search
CPC ........ H02K 44/00; H02K 44/02; H02K 44/04; H02K 44/06; H02K 44/08; H02K 44/085;
(Continued)

(56) References Cited

U.S. PATENT DOCUMENTS 9,551,706 B2 * 1/2017 Phillips ............ G01R 33/1269
2004/0076525 A1 * 4/2004 Olivier ................ B01L 3/50273
417/92
(Continued)

FOREIGN PATENT DOCUMENTS

| CN | 105170316 A | 12/2015 |
| CN | 106197117 A | 12/2016 |

(Continued)

OTHER PUBLICATIONS

English Machine Translation of DE-19641737-A1 (Year: 1997).*
(Continued)

*Primary Examiner* — Nathan C Zollinger
(74) *Attorney, Agent, or Firm* — Nixon & Vanderhye

(57) ABSTRACT

Disclosed is a device including at least one circulating zone and at least one fluid including at least one more-paramagnetic liquid and at least one less-paramagnetic liquid form-
(Continued)

ing a liquid-liquid interphase, the device including at least one element generating, in the circulating zone, a magnetic field, wherein the less-paramagnetic liquid is surrounded by the more-paramagnetic liquid in the circulating zone or wherein the more-paramagnetic liquid is surrounded by the less-paramagnetic liquid in the circulating zone. Also disclosed is a method including circulating at least one less-paramagnetic liquid inside one or more circulating zones of a device including at least one circulating zone and at least one more-paramagnetic liquid in the circulating zone.

13 Claims, 12 Drawing Sheets

(51) Int. Cl.
  *F04B 43/12* (2006.01)
  *F04B 49/06* (2006.01)
  *H02K 44/00* (2006.01)
(58) Field of Classification Search
  CPC .......... F04B 49/06; F04B 43/12; F04B 43/10; F04B 17/00; F05B 2210/11
  See application file for complete search history.

(71) Applicants: THE PROVOST, FELLOWS, FOUNDATION SCHOLARD, AND THE OTHER MEMBERS OF BOARD, OF THE COLLEGE OF THE HOLY AND UNDIVIDED TRINITY OF QUEEN ELIZABETH NEAR DUBLIN, Dublin (IE)

(56) References Cited

U.S. PATENT DOCUMENTS

| | | |
|---|---|---|
| 2007/0104624 A1 | 5/2007 | Aogaki et al. |
| 2007/0217931 A1* | 9/2007 | Estes ................... F04B 43/082 417/474 |
| 2010/0285606 A1 | 11/2010 | Phillips et al. |
| 2018/0100492 A1* | 4/2018 | Bessho ................... F01N 3/043 |

FOREIGN PATENT DOCUMENTS

| | | | |
|---|---|---|---|
| DE | 19641737 A1 * | 12/1997 | ............ C30B 13/30 |
| DE | 19641737 A1 | 12/1997 | |
| DE | 10244867 A1 | 4/2004 | |
| EP | 2554883 A2 | 2/2013 | |
| FR | 2830777 A1 | 4/2003 | |
| JP | H02-27118 A | 1/1990 | |
| JP | H02-271180 A | 11/1990 | |

OTHER PUBLICATIONS

Coey et al., "Magnetic stabilization and vorticity in submillimeter paramagnetic liquid tubes", Proceedings of the National Academy of Sciences of the United States of America, 2009, vol. 106, No. 22, pp. 8811-8817.

International Search Report and Written Opinion, dated Feb. 28, 2018, from corresponding PCT application No. PCT/EP2018/051325.

Park and Park, "Design of Magnetic Fluid Linear Pump," IEEE Transactions on Magnetics, vol. 35, No. 5, Sep. 1999, pp. 4058-4060.

Park and Seo, "New Design of the Magnetic Fluid Linear Pump to Reduce the Discontinuities of the Pumping Forces," IEEE Transactions on Magnetics, vol. 40, No. 2, Mar. 2004, pp. 916-919.

Mao and Koser, "Towards ferrofluidics for μ-TAS and lab on-a-chip applications," Nanotechnology 17, 2006, pp. S34-S47.

Friedrich et al., "Magnetic traveling-stripe-forcing: enhanced transport in the advent of the Rosensweig instability," physics.flu-dyn, Apr. 23, 2010, 6 pages.

Ando et al. "A Novel Non-invasive Implementation of Pumping Mechanism in Pre-existing Capillary," IEEE Sensors 2009 Conference, 2009, pp. 1349-1353.

* cited by examiner

DEVICE AND METHOD FOR CIRCULATING LIQUIDS

The invention relates to a device and a method for circulating liquids.

In particular, the invention relates in particular to a device and a method for circulating a less-paramagnetic liquid into an enclosing more paramagnetic liquid or for circulating a more-paramagnetic liquid into an enclosing less paramagnetic liquid.

PRIOR ART

Transporting fluids (gas or liquid) from point A to B in a controlled manner has been a vital technology underlying much science and technology. A pump is a device invented for transporting fluids by mechanical action. A wide variety of pumps have been invented depending on the type and volume of fluids one desires to transport, which can be largely classified as positive displacement pumps or centrifugal pumps (also called rotodynamic pumps). Positive displacement pumps squeeze fluid directly while centrifugal pumps speed up fluids and convert the kinetic energy to pressure.

Magnetic fields are already exploited in many areas of research and industrial practice to achieve levitation (e.g. high-speed bearings, maglev trains), but more importantly in magnetic separation. The latter operates from extremely large industrial scales (e.g., sorting scrap metal) down to removal of small (bio)molecules from biological fluids like blood. These separation methods make use of the magnetic field gradient force and the difference in susceptibility of material that is attracted to the magnet and its surrounding medium. In high (magnetic)liquids with very high susceptibility such as ferrofluids, a magnetic field can induce a spectacular structuring of the liquid, magnetic tuning of viscosity, or actuation. These phenomena not only work for magnetic liquids based on (super)paramagnetic particles, but also for lower magnetic susceptibility liquids containing paramagnetic ions. One of the present inventors and others have exploited the magnetic field gradient force to stabilize aqueous paramagnetic liquid tubes inside water. In this early work, large uniform external fields were used to magnetize iron wires, generating local magnetic field gradients, which in turn could guide the flow of paramagnetic liquids. Several drawbacks have so far prevented the adoption of the liquid tube technology especially in the field of microfluidics, namely i) the need for a large electromagnet to create the external field, ii) limited lifetime of the paramagnetic liquid tubes, due to diffusion of ions into the medium (decreasing the susceptibility difference), iii) toxicity of paramagnetic ions, and iv) limited stable geometries of the microfluidic circuitry.

Microfluidics has evolved greatly in the past decades from a niche spin-off of liquid chromatography into its own field of research giving exquisite control over fluids. Some of the most exciting applications are found in diagnostics, chemical synthesis, lab-on-a-chip, and purification and separation in general. Typical microfluidic channels range in size from 50 to 500 µm, ensuring low Reynolds numbers and therefore laminar flow inside the devices. The latter flow behaviour is well-defined and has allowed a great control over molecular diffusion leading to on-demand generation of concentration gradients, etc. . . . .

A more challenging limitation of microfluidic technology is the change in fluid behaviour at small scales, leading to laminar flow at low Reynolds number. Mixing of solutes in such small laminar flows only occurs by diffusion (across the width of the channel) and Taylor dispersion (along the length), instead of by convective mixing on larger scales. Therefore, two liquids travelling alongside one another need several centimetres to mix properly. Passive and active microfluidic mixers have been designed to accelerate mixing, but are challenging to incorporate into devices since they require complex 3D geometries or miniaturized actuation. Lastly, there are several key practical issues limiting the reliability, re-usability and long-term stability of microfluidic devices such as fouling or adsorption onto the walls of the channel due to the high surface-to-volume ratio, clogging of channels due to dust particles, and leaking at high fluid pressure due to faulty connections or device delamination.

In 2009, Coey et al. (Coey, J. M. D.; Aogaki, R.; Byrne, F.; Stamenov, P. *Proc. Natl. Acad. Sci. USA* 2009, 106 (22), 8811-8817) demonstrated proof-of-principle experiments that aimed to replace the conventional physical walls in fluidic devices with virtual walls by using specific magnetic field arrangements. They could form a 'liquid tube' of a paramagnetic aqueous solution (water containing dissolved 3d or 4f ions) within a diamagnetic aqueous liquid, or vice versa, leading to a 'liquid anti-tube'. The liquid tube and anti-tube still have a bottom contact with a stationary magnetic track, though the wall contact is drastically decreased as compared to the containment by a surrounding solid wall in conventional microfluidics. The liquid tube behaves as if a self-healing elastic membrane surrounded it, due in part to the local magnetic pressure. This leads to a free boundary with a uniform fluid velocity at the fluid/fluid interface of the tube, as opposed to a no-slip condition at the fluid/solid interface in normal microfluidics. In addition, the seminal work of Coey et al. also demonstrated that the magnetic field force prevents convection around the liquid tube, but does not inhibit vorticity, and thus mixing, within the tube or anti-tube.

While Coey's work was an important milestone toward a new type of microfluidics, there were a number of challenges remaining to achieve viable microfluidic applications. Moreover, the toxic paramagnetic ions ions such as holmium ($Ho^{3+}$), gadolinium ($Gd^{3+}$), cobalt ($Co^{2+}$), or others diffuse across the liquid/liquid interface because both media are aqueous. In short, the system was promising but not usable for life science applications. In particular, Coey required dissolution of high concentrations of toxic magnetic ions to obtain sufficient magnetic susceptibility that was responsible for the magnetic forces, which the present invention aims to avoid. Furthermore, the liquid tube or antitube was not completely surrounded by a magnetically-contrasting liquid sheath, but remained in contact on one side with a solid magnetic track.

The French patent application FR 2830777 (CEA) relates to a microfluidic device for the manipulation of a non-magnetic liquid (Abstract). It discloses a reconfigurable active microfluidic device, using a magnetic liquid to form a wall for a volume of a non-magnetic liquid to be manipulated. Creating a deformation in the volume of magnetic liquid forms this wall. This deformation enables a non-magnetic liquid, immiscible with the magnetic liquid (or plural non-magnetic liquids, immiscible with the magnetic liquid) to be integrated into the device. However, FR 2830777 still comprises a contact of the liquid tube with a solid wall.

The American patent application US 2007/0104624 relates to a microreactor comprising a liquid inlet, a fine liquid channel and a liquid discharge zone characterized in that the liquid channel is formed of a magnetic barrier of band ferromagnet so that a magnetic liquid introduced through the inlet undergoes at least one operation of chemical reaction, mixing, extraction and absorption in the liquid channel (abstract). However, US 2007/0104624 still comprises a contact of the liquid tube with a solid wall.

The European patent application EP 2554883 relates to a control valve with at least one, from a channel wall bounded control channel, in its channel interior, a deformable control element is provided which is prepared as a stable suspension of magnetic nanoparticles in a carrier liquid (so-called "ferrofluid") and between at least two magnets is held in such a way in the channel interior, that the permeability of the control member of the regulating element and thus the built-up differential pressure by means of a relative movement of the magnets caused change in the between the magnets generated magnetic field or by changing the field strength is variable (with solenoid). EP 2554883 does not teach how to circulate a liquid along a circulating zone without contact with the channel wall.

The Japanese patent application JP 0227118 relates also to a control valve using a magnetic fluid. The magnetic fluid throttles a pipe passage and works like a valve disc. JP 0227118 does not teach how to circulate a liquid along a circulating zone without contact with the channel wall. There is no theoretical null point of magnetic field in the configuration of JP 0227118.

The German patent application DE 19641737 relates to a device and a method for levitation of non-magnetic solid, gas and/or liquid volumes. DE 19641737 does not teach how to circulate a liquid along a circulating zone without contact with the channel wall.

AIMS OF THE INVENTION

In the present invention, the inventors show that all of the above limitations can be overcome.

Accordingly, the present invention aims to overcome one or more of the above-recited technical problems.

In particular, the present invention aims to overcome the technical problem of providing a device and method having an improved stability of the paramagnetic liquid tube, and especially an improved lifetime of the paramagnetic liquid tube and an improved spatial stability of the paramagnetic liquid tube (improved stable geometry).

In particular, the present invention aims to overcome the technical problem of providing a device and method working with different kind of paramagnetic liquids, not only toxic paramagnetic ions.

In particular, the present invention aims to overcome the technical problem of providing an industrial device and method using a compact source of magnetic field, with reasonable costs for industrialization.

In one embodiment, the present invention aims to overcome the technical problem of providing a device and method for life sciences applications or applications with small dimension or diameter of the liquid tube (unless contrary expression the term "tube" also designates according to the present invention the so called "antitube" configuration).

In one embodiment, the present invention aims to overcome the technical problem of providing a device and method for microfluidics applications, and in particular a suitable size for microfluidics applications, on the submillimetre scale (<1 mm).

The present invention also aims to overcome one or more of the above recited technical problems regarding microfluidics applications, and in particular aims to overcome the technical problem of providing an industrial device and method for microfluidics applications with improved mixing of fluids even under conditions where in traditional (solid wall) microfluidic devices one would obtain laminar flow. That is, the absence of no-slip conditions in the present invention can lead to flow instabilities (and eddies) that would not occur otherwise.

In one embodiment, the present invention aims to overcome the technical problem of providing a device and method for continuous pumping applications of liquid tubes and antitubes.

A peristaltic pump is a type of positive displacement pump, which uses flexible tubing to run through rollers in the pump head. As fluid goes through the pump head, separated packets of fluids are formed. The flow rate is determined by the size of the packets and the angular velocity of the rollers, which leads to accurate flow rates. Typically, peristaltic tubing pumps offer flow rates as low as ~1 µL min$^{-1}$ to 45 L min$^{-1}$ and can generate pressures up to 8.6 bar (125 psi). A benefit of peristaltic pumps is that they confine the media to the tubing, so that the pump cannot contaminate the fluid and the fluid cannot contaminate the pump. This contamination-free pumping makes peristaltic pumps particularly suitable for use in high purity applications, including the transfer or dosing of chemicals and additives in food, pharmaceutical and semiconductor applications. In addition, as the media is confined to the tubing, a peristaltic pump offers easy maintenance and reduced downtime compared with other pumping technologies.

However, the flow is inherently pulsating, which is prohibitory in certain applications such as microfluidics. To reduce the pulsation, one can increase the number of pinching points placed accordingly. However, typical multiple rollers pumps can be expensive. In addition, the constant squeezing causes the tube to wear out, and replacements may be needed several times per year. Lack of scheduled maintenance leads to leakage of fluids to pumps and causes severe damage. The drive motor is under a constant load to keep squeezing pressure on the tube, causing more power usage. That is, the elastic deformation of the tube must be overcome for each squeezing action (i.e., dissipation of electricity into heat). Lastly, it is very challenging to incorporate temperature control inside a peristaltic pump.

The present invention also aims to overcome one or more of the above recited technical problems with peristaltic pumps, and in particular aims to overcome the technical problem of providing an industrial device and method providing pulse flow in microfluidic applications. The present invention also aims to overcome the technical problem of providing an industrial device and method with limited negative impact of mechanical moving parts.

In one embodiment, the present invention aims to overcome the technical problem of providing a device and method replacing prior art peristaltic pumps.

DESCRIPTION OF THE INVENTION

The present invention relates to a device comprising at least one circulating zone and at least one fluid comprising at least one more-paramagnetic liquid and at least one less-paramagnetic liquid forming a liquid-liquid interface, said device comprising at least one element generating, in said circulating zone, a magnetic field, wherein said less-paramagnetic liquid is surrounded by said more-paramagnetic liquid in the circulating zone or wherein said more-paramagnetic liquid is surrounded by said less-paramagnetic liquid in the circulating zone.

In one embodiment, said less-paramagnetic liquid circulates within said circulating zone and is confined in the surrounding more-paramagnetic liquid.

In one embodiment, said more-paramagnetic liquid circulates within said circulating zone and is confined in the surrounding less-paramagnetic liquid.

Advantageously, said less-paramagnetic liquid circulates though said more-paramagnetic liquid in said circulating zone.

Advantageously, said less-paramagnetic liquid circulates in said circulating zone without contact with a solid wall.

As already recited, "circulate" or an equivalent expression means transporting a fluid (gas or liquid) from point A to B. Accordingly, a fluid circulates inside the circulating zone.

In one embodiment, the device and process according to the invention provide a liquid-in-liquid flow. In one embodiment, the less-paramagnetic liquid circulates in the more-paramagnetic liquid in the circulating zone.

Advantageously, said less-paramagnetic liquid is forced to flow within said more-paramagnetic liquid. Forcing can be for example external (i.e. for example by externally applied pressure), or internal (i.e. for example by pinching of the more-paramagnetic liquid to create a pressure like for the pump). Advantageously, the flow of the less-paramagnetic liquid is guided (directionally) by the more-paramagnetic liquid.

Element Generating a Magnetic Field

Advantageously, said element generating a magnetic field in said circulating zone, with at least one low magnetic field zone and at least one high magnetic field zone, wherein said low magnetic field zone is surrounded by said high magnetic field zone.

In one embodiment, said element generating a magnetic field is selected from the group consisting of permanent or electropermanent magnets, electromagnets, magnetised soft magnets, and any combination thereof, where additionally, the field strength and/or orientation can be time dependent, for example by means of mechanical actuation and/or rotation of permanent magnets or by increasing and/or decreasing the current in an electromagnet.

In one embodiment, said elements generating a magnetic field comprise at least one permanent magnet and/or at least one electromagnet forming at least one primary source of magnetic field, and comprise at least one magnetisable softer ferromagnet forming at least one reshape and/or focus magnetic field distribution.

In one embodiment, said elements generating a magnetic field present a static design using one or more fixed sources of magnetic field, such as for example permanent magnets, steady currents in electromagnets, and any combination thereof.

In one embodiment, said elements generating a magnetic field present a dynamic switchable design, such as for example electro-permanent magnets, variable electric currents in electromagnets, mechanically actuated magnets, and any combination thereof.

In one embodiment, said elements generating a magnetic field present a combination of static and dynamic switchable designs. In one embodiment, said elements generating a magnetic field present one or more physically moving magnets, switchable magnets, or any combination thereof.

In one embodiment, said elements generating a magnetic field comprise horizontally magnetised soft magnets or horizontally magnetised multi-track hard magnets.

In a specific embodiment, said elements generating a magnetic field comprise a bilayer consisting of for example of two permanent magnets vertically magnetised in opposition directions.

In a specific embodiment, said elements generating a magnetic field comprise a bilayer consisting of two permanent magnets horizontally magnetised in opposition directions.

In a specific embodiment, said elements generating a magnetic field comprise a bilayer comprising horizontally magnetised permanent and soft magnets.

In a specific embodiment, said elements generating a magnetic field comprise permanent magnets vertically magnetised in parallel or opposite directions.

In a specific embodiment, said elements generating a magnetic field comprise permanent magnets horizontally magnetised in parallel or opposite directions.

In one embodiment, said device comprises a multipolar configuration of N magnets with N equal or greater than 2 or equal or greater than 3, N representing the number of magnets In a specific embodiment, said elements generating a magnetic field comprising a magnetic quadrupole. In a specific embodiment, said elements generating a magnetic field comprising a quadrupolar array of permanent magnets.

The tube cross-sections can be any form of closed geometry, not just circular or elliptical ones. For example, complicated magnetic field patterns can give rise to star shaped cross-sections. Furthermore, a given arrangement of magnetic source can stabilize more than one tube, e.g. four outer stable points or two stable points or three channels.

Magnet assemblies can consist of any arbitrary geometry, such as rings, cylinders, coils, wedges, and not just the prismatic examples given below.

In different embodiments, the trajectories of the less-paramagnetic liquid in said circulating zone include, but are not limited to, isolated tracks in arbitrary directions, and/or multiple pathways that cross at designated points.

Magnetic Field

Advantageously, the force field is such that high field regions separate the low field zone from the rigid walls of the device, thereby making no contact of the less-paramagnetic circulate inside said more-paramagnetic liquid with solid wall(s) of said device or thereby making no contact of the more-paramagnetic circulate inside said less-paramagnetic liquid with solid wall(s) of said device.

In one embodiment, said elements generating a magnetic field generate a symmetric magnetic field in the cross-section of the liquid-liquid interface.

Typically, according to the invention a less-paramagnetic liquid circulates in a more-paramagnetic liquid and forms a tube in said more-paramagnetic liquid. The magnetic field is advantageously symmetric in the cross-section of said tube formed by said less-paramagnetic liquid.

In one embodiment, elements generating a magnetic field generate a low magnetic field zone and a high magnetic field zone, wherein said low magnetic field zone is surrounded by said high magnetic field zone. The expression "said low magnetic field zone is surrounded by said high magnetic field zone" means that in a cross-section of the liquid-liquid interface in said circulating zone said low magnetic field zone is surrounded by said high magnetic field zone.

Advantageously, in one embodiment, the magnetic field is theoretically null along the centre of the cross-section of the circulating zone or tube. For example, for an antitube, the magnetic field is theoretically null along the central axis of the tube (FIG. 23).

An antitube is defined as a less-paramagnetic liquid confined in the form of a tube within a more-paramagnetic liquid.

Due to the magnetic field gradient produced according to the invention, the more-paramagnetic liquid is (more) attracted to high field regions, allowing a magnetically weaker active liquid (i.e. with a susceptibility less than the confining fluid) to stabilize as a tube in the low magnetic field region. Either miscible or immiscible fluids can be used, in the latter case the magnetic forces can overcome surface tension. The active liquid can then flow freely through the liquid tube, which is solely defined by the magnetic field, and whose direction and diameter can be dynamically changed by energising electro/electro-permanent magnets, or actuating magnets.

Liquid

According to the invention the term "liquid" is technically very broad and covers all kind of configurations including a liquid. In one embodiment, "Liquid" designates multiphase liquids. In one embodiment, "Liquid" designates liquid emulsions, liquid with solid particles (colloidal suspensions); liquid including gas. In one embodiment, "Liquid" designates liquids comprising or consisting of only one liquid component. In one embodiment, "Liquid" designates liquids comprising or consisting of multiple liquid components.

In one embodiment, said fluid comprises miscible or immiscible liquids. Advantageously, said more-paramagnetic liquid and said less-paramagnetic liquid are immiscible liquids. When said more-paramagnetic liquid and said less-paramagnetic liquid are immiscible, there will be limited or even no mixing between the two liquids thereby limiting or even eliminating contamination effects of components from one liquid to the other.

More-Paramagnetic Liquid

The term "more-paramagnetic liquid" designates a liquid that is more paramagnetic than the less-paramagnetic liquid or has a higher paramagnetic susceptibility than said less-paramagnetic liquid.

In one embodiment, said more-paramagnetic liquid is a paramagnetic liquid.

The term "paramagnetic liquid" includes any superparamagnetic liquid and combination thereof.

Example of paramagnetic materials at room temperature include copper sulphate, other salts of iron group (3d), palladium group (4d), platinum group (5d). Other examples include substances possessing persistent radicals such nitroxides like TEMPO ((2,2,6,6-Tetramethylpiperidin-1-yl) oxyl), transition metal or lanthanide ionic liquids e.g. $[PR_4]_2$ $[CoCl_4]$ where $[PR_4]$ is trihexyl(tetradecyl)phosphonium, lanthanide containing liquid crystals e.g. $[Dy(LH)_3(NO_3)_3$ where LH is the Schiff's base ligand, rare earth (4f) metals, or stable (triplet) carbenes.

In one embodiment, said paramagnetic liquid is a dispersion of magnetic particles in a liquid such as magnetorheological fluids and ferrofluids.

Typically, said more-paramagnetic liquid comprises one or more paramagnetic materials.

In one embodiment, said one or more paramagnetic materials are dissolved in a liquid, for example in water.

In a specific embodiment, said more-paramagnetic liquid is an organic liquid, and for example an oil.

The term "oil" as used herein refers to any material which is substantially insoluble in water. Suitable oil components include, but are not limited to, natural oils, hydrocarbons such as mineral oil and hydrogenated polyisobutene, fatty alcohols; fatty esters; fatty diesters; fatty triesters, silicones and any mixture thereof.

In one embodiment, said more-paramagnetic liquid comprises one or more surfactants. Advantageously, a surfactant helps to lower the surface tension of the more-paramagnetic liquid with the less-magnetic liquid.

In one embodiment, said less-paramagnetic liquid comprises one or more surfactants.

In one embodiment, both the less- and the more-paramagnetic liquids contain one or more surfactants. Advantageously, the use of the latter multiple surfactant approach can lead to very low (below 1 mN m$^{-1}$) surface tensions.

Less-Paramagnetic Liquid

The term "less-paramagnetic liquid" designates a liquid that is diamagnetic, or has a lower paramagnetic susceptibility than said more-paramagnetic liquid.

In one embodiment, said less-paramagnetic liquid is a diamagnetic liquid.

In one embodiment, said less-paramagnetic liquid is a biological fluid or a fluid including a suspension of biological cells in a liquid medium.

In one embodiment, said device comprises an organic paramagnetic liquid.

In a specific embodiment, said biological fluid is a suspension of biological cells in a liquid medium.

In a specific embodiment, said biological fluid is blood or comprises blood components.

In a specific embodiment, said biological fluid comprises red blood cells or plasma.

In a specific embodiment, said biological fluid is a human or animal fluid.

In a specific embodiment, said less-paramagnetic liquid is an aqueous liquid and preferably an aqueous diamagnetic liquid.

In one embodiment, said device comprises in said circulating zone a "liquid tube" (usually called "anti-tube") of a diamagnetic liquid within a more-paramagnetic liquid.

In a specific embodiment, said less-paramagnetic liquid is an aqueous liquid and preferably an aqueous diamagnetic liquid, surrounded by an organic liquid, and for example an oil.

Type of Device

In one embodiment, the invention relates to a microfluidic device, a magnetically actuated fluid valve, a magnetically actuated peristaltic pump, an anti-fouling device, an anti-clogging device, a propulsion device, a heat exchanger, an extractor, a desalinator, or a mixing device.

In one embodiment, the device and process according to the invention provides common fluidic operations including valving, mixing, and peristaltic pumping with moving permanent magnets having no physical contact with the solid walls of the circulating zone or tube.

For example, valves can be constructed by adding a magnet whose axis of magnetization is perpendicular to that of the main magnet design (for example a quadrupole) confining one liquid in the other. These valving magnets simply pinch the antitube by removing the null field at the center, thus interrupting the liquid flow.

In one embodiment, the largest dimension of the cross-section or the diameter of the less-paramagnetic liquid circulating zone or tube is equal or lower than 50 cm, or than 5 cm, or than 5 mm, or than 1 mm, or than 0.9 mm, or than 0.8 mm, or than 0.5 mm.

In one embodiment, the largest dimension of the cross-section or the diameter of the less-paramagnetic liquid circulating zone or tube is equal or higher than 10 micrometers (μm), or than 50 μm, or than 100 μm.

In one embodiment, the invention relates to a device having a circulating zone or tube having a suitable size for microfluidics applications, typically on the sub-millimetre scale (<1 mm).

In one embodiment, the device and process according to the invention provides a non-laminar flow in the circulating zone or tube. More particularly, the device and process according to the invention provides a non-laminar flow in a circulating zone or tube having a suitable size for microfluidics applications, typically on the sub-millimetre scale.

In one embodiment, the largest dimension of the cross-section or the diameter of the circulating zone or tube is equal or lower than 10 micrometers, for example equal or lower than 5 micrometers.

In one embodiment, the length of the circulating zone or tube is equal to 3 times or higher than 3 times the largest dimension of the cross-section or the diameter of said circulating zone or tube.

In one embodiment, the length of the circulating zone or tube is equal to 10 times or higher than 10 times the largest dimension of the cross-section or the diameter of said circulating zone or tube.

Advantageously, the distance between the permanent magnets changes the magnetic field gradients close to the centre of the gap. In general, the smaller the gap size is, the smaller anti-tube diameter can be obtained.

In one embodiment, the device according to the invention is manufactured by 3D-printing.

In one embodiment, at equilibrium, stable confinement of an antitube results from the competing magnetic energy of the confining fluid and the surface energy a of the magnetic/nonmagnetic interface, and the diameter of the less-paramagnetic liquid circulating in the more-paramagnetic liquid (or the diameter of the antitube) may be estimated with the following equation (1):

$$d = \frac{4\sigma}{2\mu_0 \overline{M} H_I + \mu_0 M_I^2} \quad (1)$$

where $H_I$, $M_I$ are the magnetic field and magnetization values at the interface, and $\overline{M}$ is the field-averaged magnetization of the confining fluid induced by $H_I$. This simplified expression considers the magnetic pressure, $\frac{1}{2}\mu_0 H^2$, to be significantly larger than any difference in hydrostatic pressure. Equation (1) can be linearized when $M=\chi H$, under the geometrical conditions $w \leq \frac{1}{2} h$, and $d \leq \frac{1}{2} w$, typical of our devices. This linear model (LM) gives the minimum equilibrium dimensionless diameter $d^*=d/w$ as $$d^* = \sqrt[3]{\frac{\pi^2}{N_D 2\chi(2\chi + 1)}} \quad (2)$$

where $$N_D = \frac{\mu_0 M_r^2 w}{\sigma}$$

is the magnetic confinement number expressing the ratio of magnetic to surface energies. Accordingly, the present invention relates also to a method for estimating the diameter of an antitube by at least one of equations (1) and (2). Such a method is preferably assisted by computer calculation. The invention also relates to a computer program for estimating the diameter of an antitube by at least one of equations (1) and (2). Accordingly, the invention also relates to a computer readable support supporting said computer program.

Pump

In one embodiment, said device comprises a movable pinching point in said circulating zone, said movable pinching point moving in the liquid flow direction to circulate said fluid in said circulating zone.

Advantageously, the present invention allows stabilization of the aqueous anti-tube interface using non-toxic and water-immiscible magnetic media, magnetic control of the anti-tube diameter due to magnet design, and by external perturbations of the field, manufacturing of magnetically actuated fluid valves, manufacturing of a magnetically actuated peristaltic pump, and providing anti-fouling devices and methods.

Conventional prior art tubes or microfluidic channels are surrounded by solid walls which cause clogging and fouling due to the adhesion of solutes. The presence of solid walls also creates shearing of fluids due to the friction at the wall. No solid wall exists in the case of a magnetically stabilized liquid anti-tube according to the invention, and thereby overcome these technical problems.

Advantageously, a device and method according to the invention provides low shearing fluidic channels. For the pumping application, this is an additional benefit, since it would render the pump suitable for biological applications.

Advantageously, a device and method according to the invention provide a good flexibility regarding pumping rate and pressure. Particularly, device and method according to the invention have advantages over state of art devices at low flow rate and pressure range. To achieve low flow rate or pressure, the moving part of pumps need to run at very slow rate. For example, for peristaltic pump with rollers, the rotation speed needs to be reduced to achieve slow flows. Then it is difficult to remove pulsation of the flow. In a device and method according to the invention, the number and the strength of pinching points is controlled by the magnetic field. To reduce the flow rate or pressure, one embodiment is to decrease the strength of magnetic field instead of decreasing the frequency of pinching. This makes the device and method according to the invention stronger than current state-of-art for making pulsation-free flow. In addition, the pump cost (in components) of a device and method according to the invention is much lower than peristaltic pumps of the prior art.

Also, since the pinching/releasing is exerted on a ferrofluid or on said more-paramagnetic liquid instead of on a physical tube, there is no wear, and the device and method according to the invention can therefore likely run for extended periods of time without needing replacement parts. In typical peristaltic pumping applications, the tubes must be replaced frequently.

In one embodiment, the present invention allows moving the less-paramagnetic fluid surrounded by said more-paramagnetic fluid, or the more-paramagnetic fluid surrounded by said less-paramagnetic fluid, by interfacial instabilities develop at the fluid-fluid interface due to the unstable growth of interfacial perturbations. These instabilities may be magnetically driven (such as Rosensweig instability). Rosensweig instabilities can lead to complex shapes than can be generated by the magnet arrays as proposed in the present invention.

In one embodiment, said device comprises an undulated liquid-liquid interface (due to normal-field instabilities), where said undulations can move in the liquid flow direction to circulate said fluid in said circulating zone.

Method

The invention relates to a method comprising circulating at least one less-paramagnetic liquid inside one or more circulating zones of a device comprising at least one circulating zone and at least one more-paramagnetic liquid in said circulating zone, said device comprising at least one element generating, in said circulating zone, a magnetic field, wherein said less-paramagnetic liquid is introduced in a circulating zone, said less-paramagnetic liquid circulating in said circulating zone comprising at least one more-paramagnetic liquid, thereby forming a liquid-liquid interface with said more-paramagnetic liquid, wherein said less-paramagnetic liquid is surrounded by said more-paramagnetic liquid in the circulating zone.

The invention also relates to a method comprising generating a magnetic field comprising a low magnetic field zone and a high magnetic field zone, wherein said low magnetic field zone is surrounded by said high magnetic field zone thereby providing said liquid-liquid interface configuration with said more-paramagnetic liquid surrounding said less-paramagnetic liquid.

In one embodiment, in the method of the invention, said device is as defined according to the present invention.

In one embodiment, the invention relates to a method comprising circulating at least one less-paramagnetic liquid inside one or more more-paramagnetic liquids, wherein method comprising generating a magnetic field providing a liquid-liquid interface configuration wherein said less-paramagnetic liquid is surrounded by said more-paramagnetic liquid.

In one embodiment, said element generating, in said circulating zone, a magnetic field generates a variation in the magnetic field thereby circulating the less-paramagnetic liquid in the circulating zone.

In one embodiment, the device or method according to the invention is a new heart-lung machine or method, for example used for heart bypass surgery.

In one embodiment, the device or method according to the invention is a microfluidic chip.

In one embodiment, the device or method according to the invention comprises circulating at least one less-paramagnetic liquid in one or more conduits, circulating of at least one more-paramagnetic liquid in one or more conduits and mixing said less-paramagnetic liquid with said more-paramagnetic liquid in one or more conduits.

In one embodiment, the device or method according to the invention comprises circulating at least one less-paramagnetic liquid in with at least one more-paramagnetic liquid one or more conduits and separating said less-paramagnetic liquid with said more-paramagnetic liquid into two or more conduits.

For example, mixing or separating can be made with a 3-way junction.

In the figures:

FIG. 2 is a plot of anti-tube diameter vs. applied pressure, and the resulting flow.

FIG. 3 represents is a plot similar to a), but using a closed outlet, leading to transient flow upon pressure increase.

Figure 5:
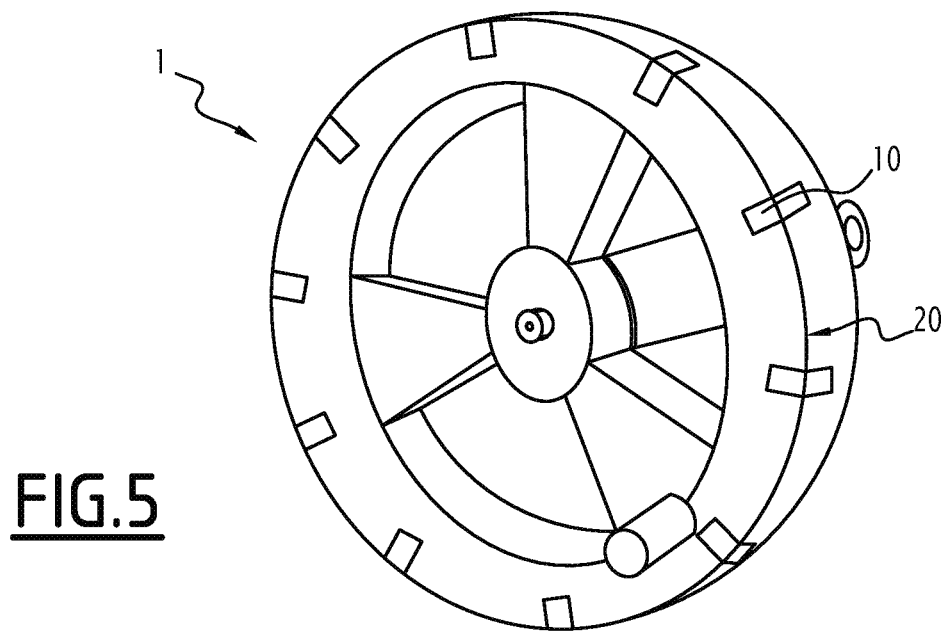

FIG. 5 represents a 3D printed wheel 1 with ten magnets 10 placed around the outer surface 20 of the wheel 1, thereby forming a magnetically actuated peristaltic pump when in combination with elements generating a magnetic field in a circulating zone, according to the invention, for example forming a quadrupole.

Figure 6:
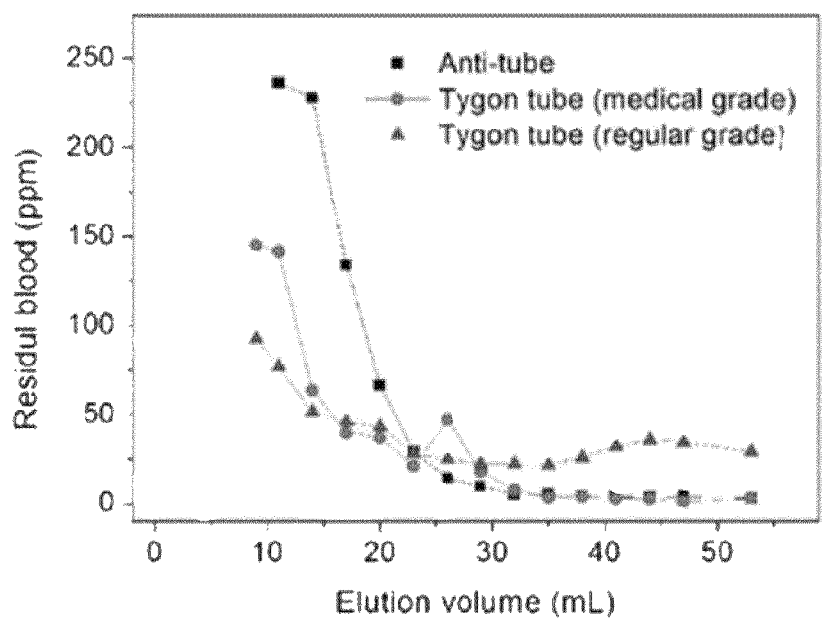

FIG. 6 represents residual blood as a function of elution volume of TMB (3,3',5,5'-Tetramethylbenzidine) rinsing in anti-tube (squares), medical grade Tygon tube (circles), and regular Tygon tube (triangles).

Figure 7:
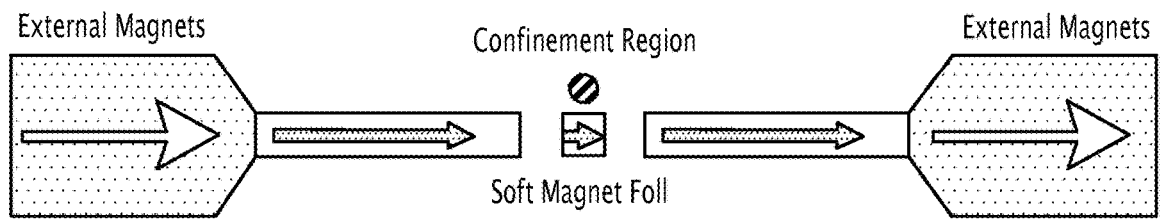

FIG. 7 represents a schematic example of permanent magnets magnetising a soft magnetic foil with two notches. The two notches generate a confinement field as shown in FIG. 8.

Figure 8:
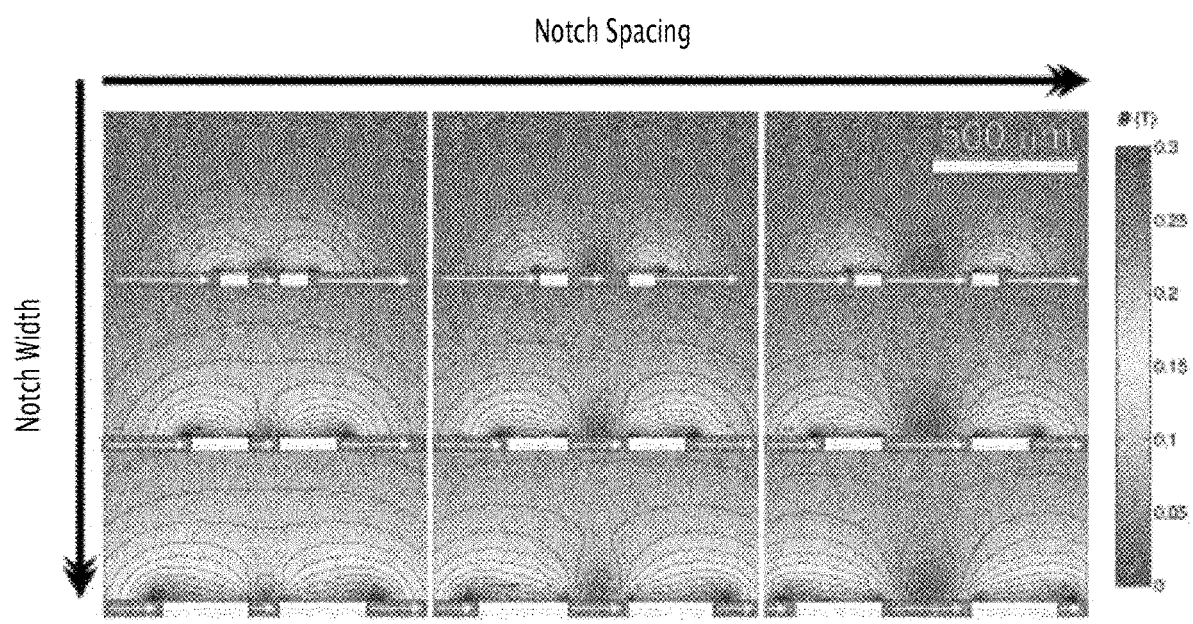

FIG. 8 represents a cross-sectional magnetic field distribution |B| for a horizontally magnetised foil with different notch cuts, from 0-0.3 Tesla (T).

Figure 9:
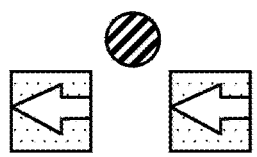

FIG. 9 represents a schematic example of two permanent magnets with the same shape as the notches in FIG. 7, but magnetised in the opposite sense.

Figure 10:
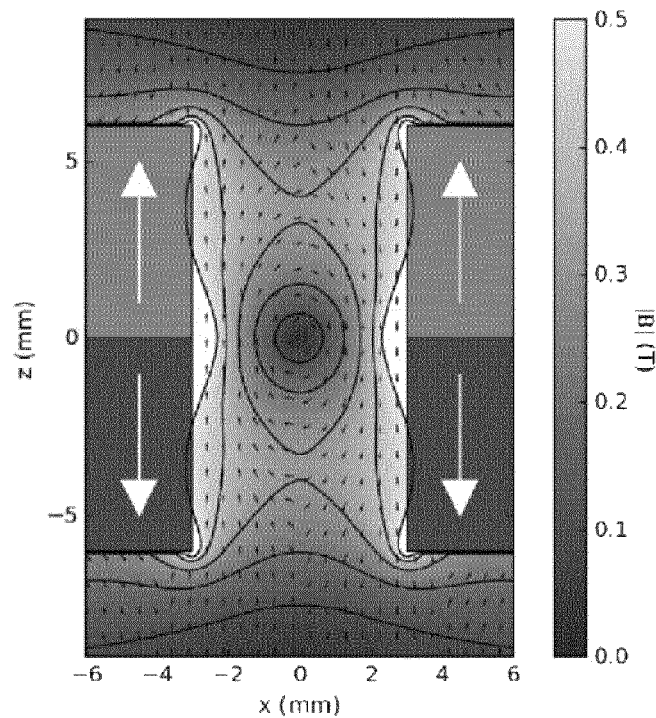

FIG. 10 represents |B| for a bilayer consisting of two permanent magnets vertically magnetised in opposition directions, from 0-0.5 Tesla (T).

Figure 11:
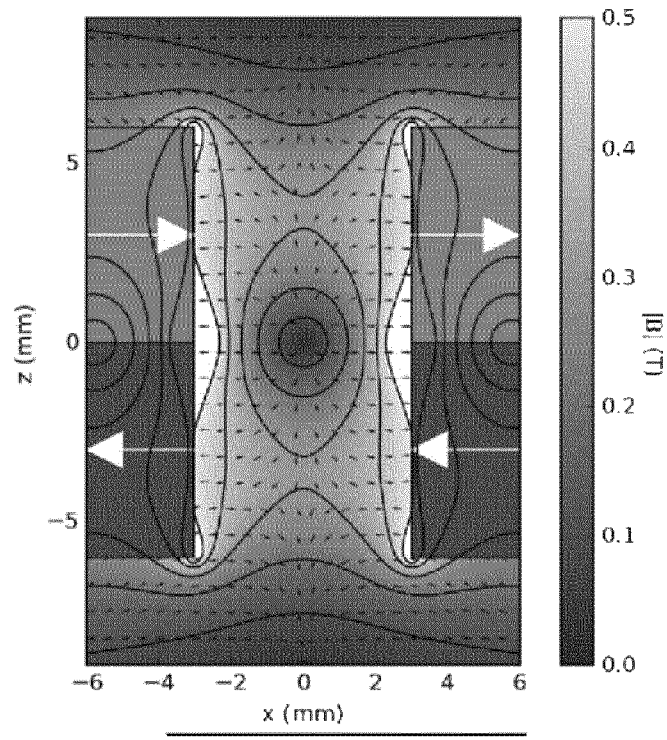

FIG. 11 represents |B| for a bilayer consisting of two permanent magnets horizontally magnetised in opposition directions, from 0-0.5 Tesla (T).

Figure 12:
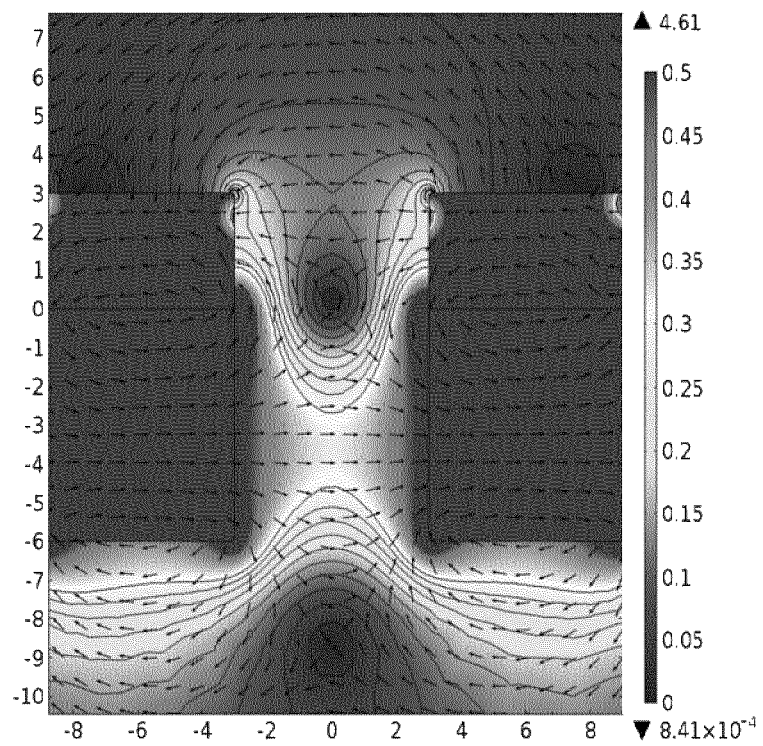

FIG. 12 represents |B| in (T) for a bilayer consisting of a horizontally magnetised permanent magnet (bottom) and soft iron foil (top) with a single cut through the bilayer, from 0-0.5 Tesla (T).

Figure 13:
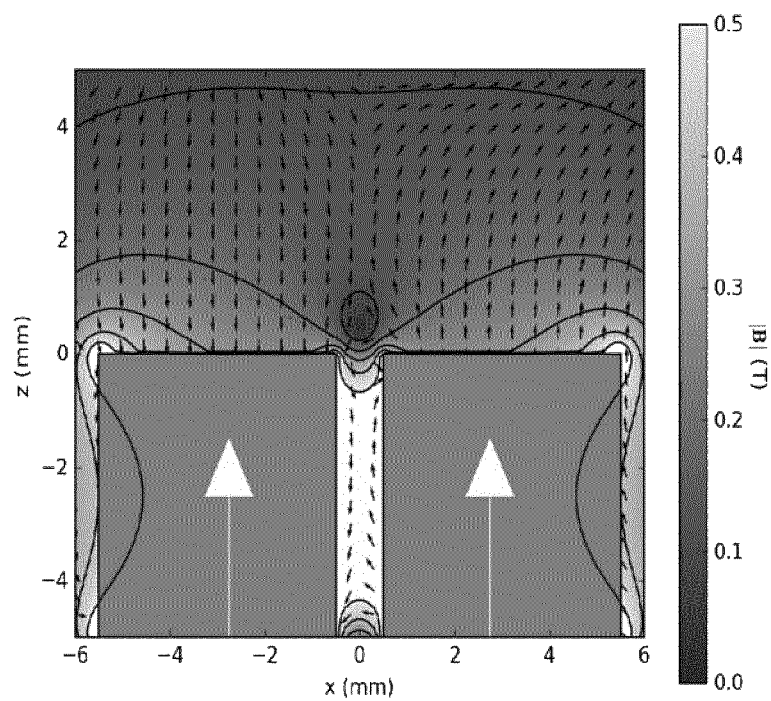

FIG. 13 represents |B| for two permanent magnets vertically magnetised in parallel, from 0-0.5 Tesla (T).

Figure 14:
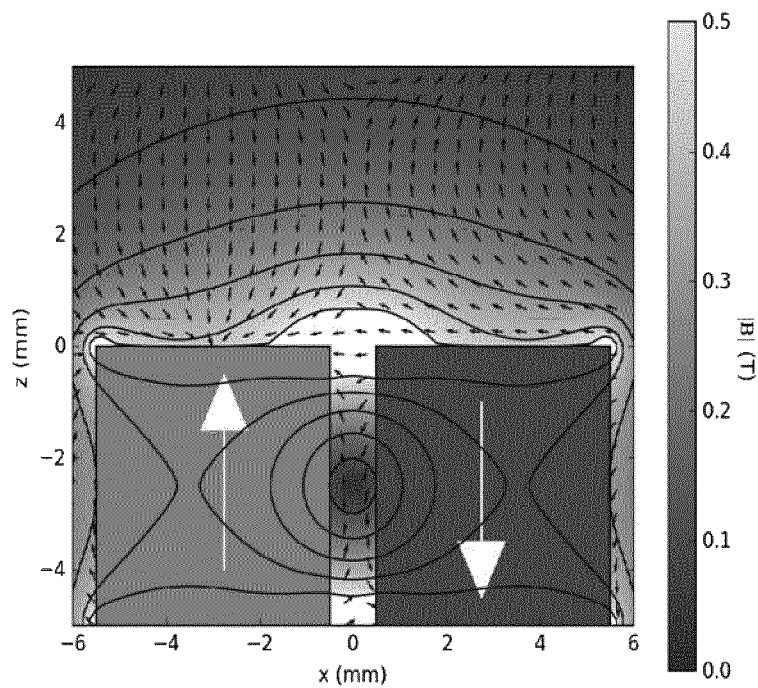

FIG. 14 represents |B| for two permanent magnets vertically magnetised in opposite directions, from 0-0.5 Tesla (T).

Figure 15:
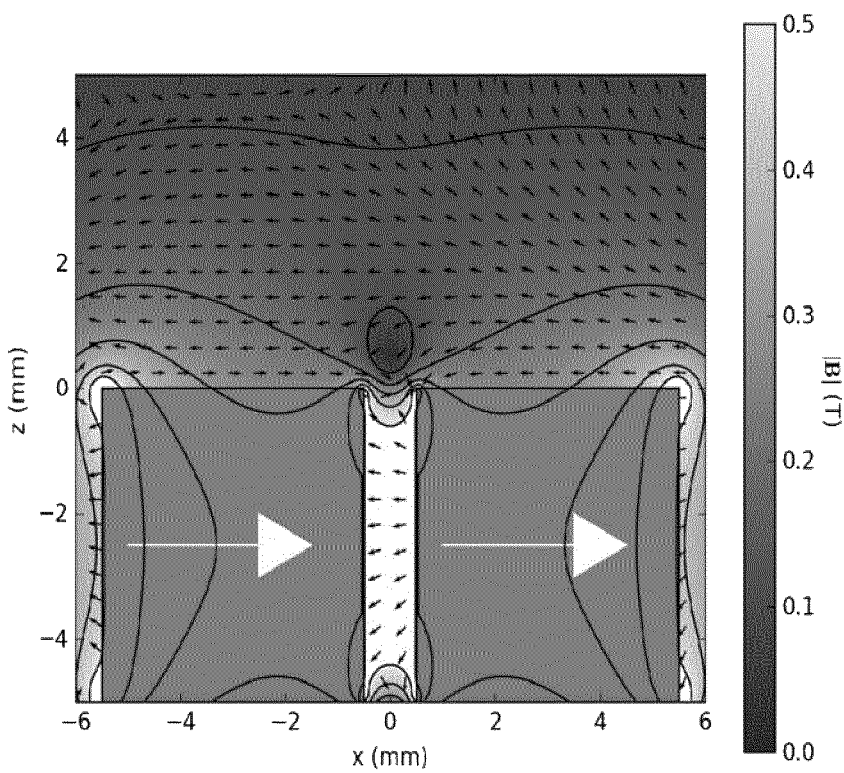

FIG. 15 represents |B| for two permanent magnets horizontally magnetised in parallel, from 0-0.5 Tesla (T).

Figure 16:
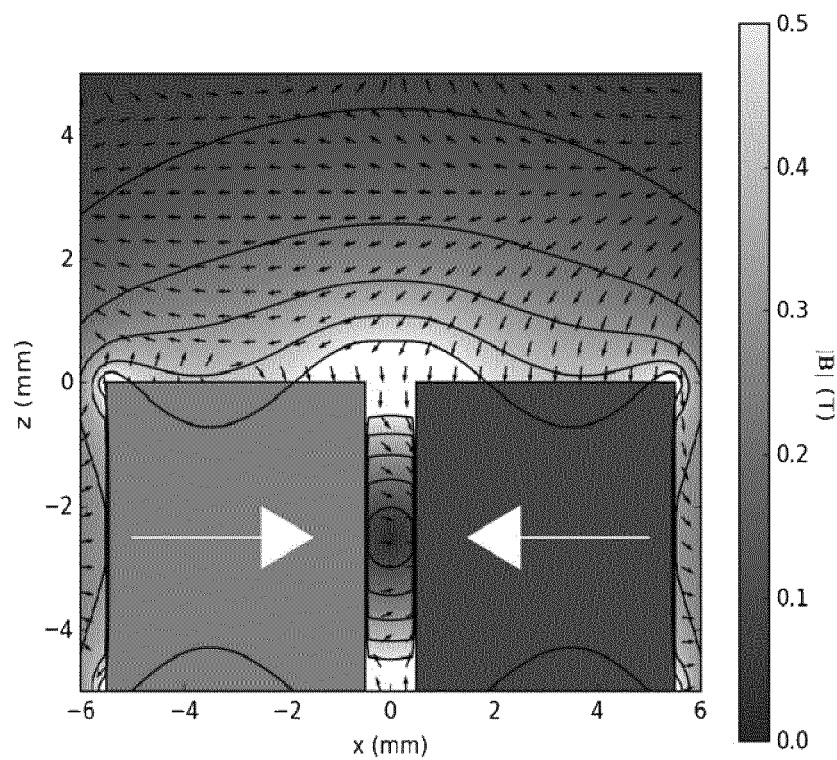

FIG. 16 represents |B| for two permanent magnets horizontally magnetised in opposite directions, from 0-0.5 Tesla (T).

Figure 17:
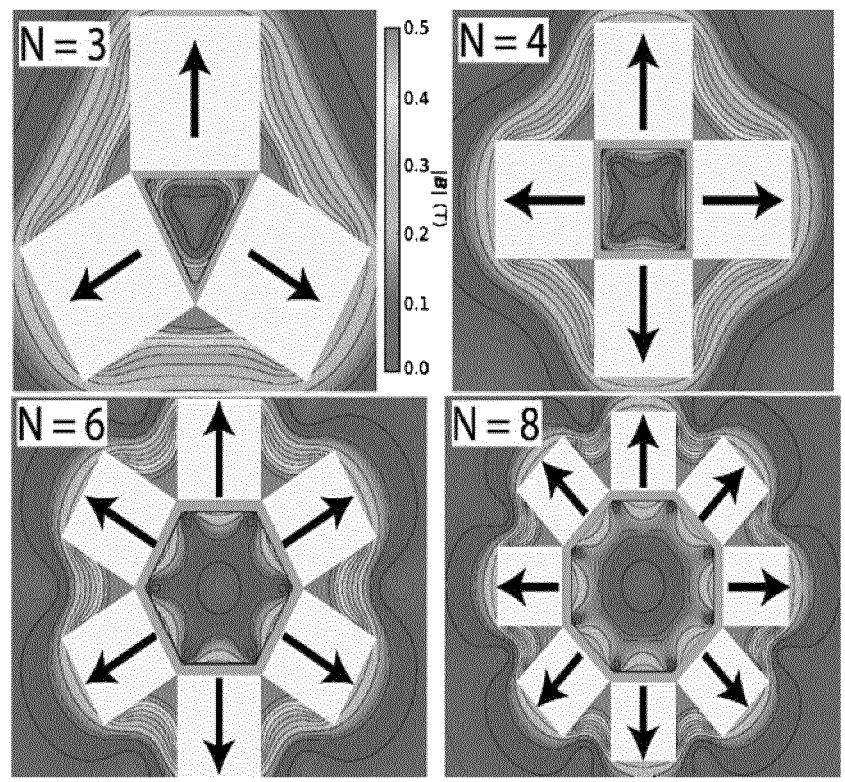

FIG. 17 represents a crossectional magnetic field magnitude distribution |B| for four multipolar geometries, N=3, 4, 6, 8; ($\delta$=1, t=0), from 0-0.5 Tesla (T).

Figure 18:
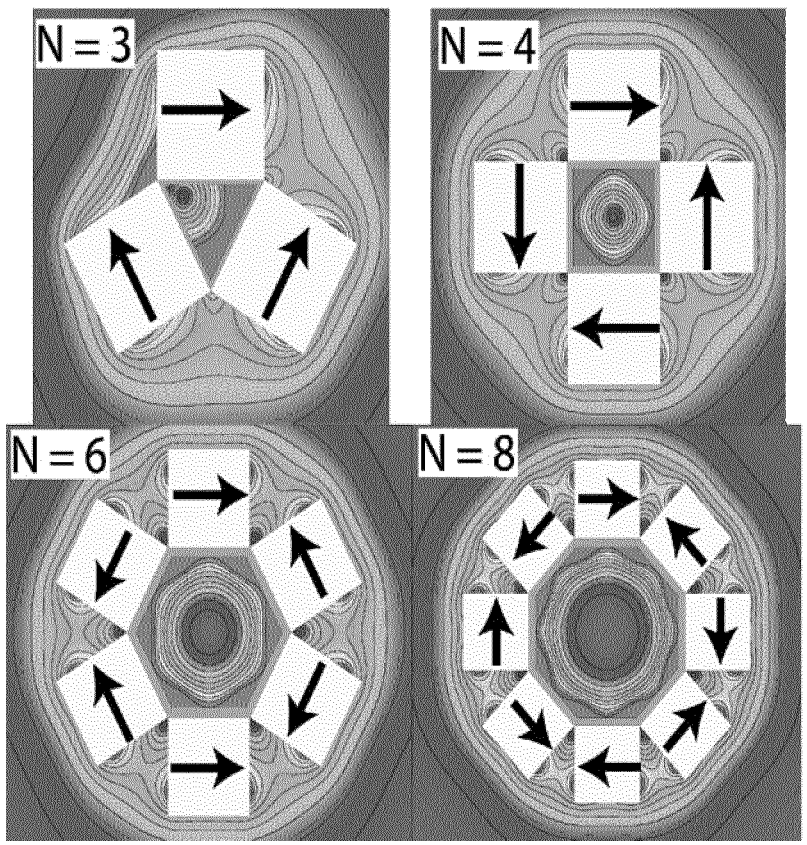

FIG. 18 represents a crossectional magnetic field magnitude distribution |B| for four multipolar geometries, N=3, 4, 6, 8; ($\delta$=0, t=0), from 0-0.5 Tesla (T).

Figure 19:
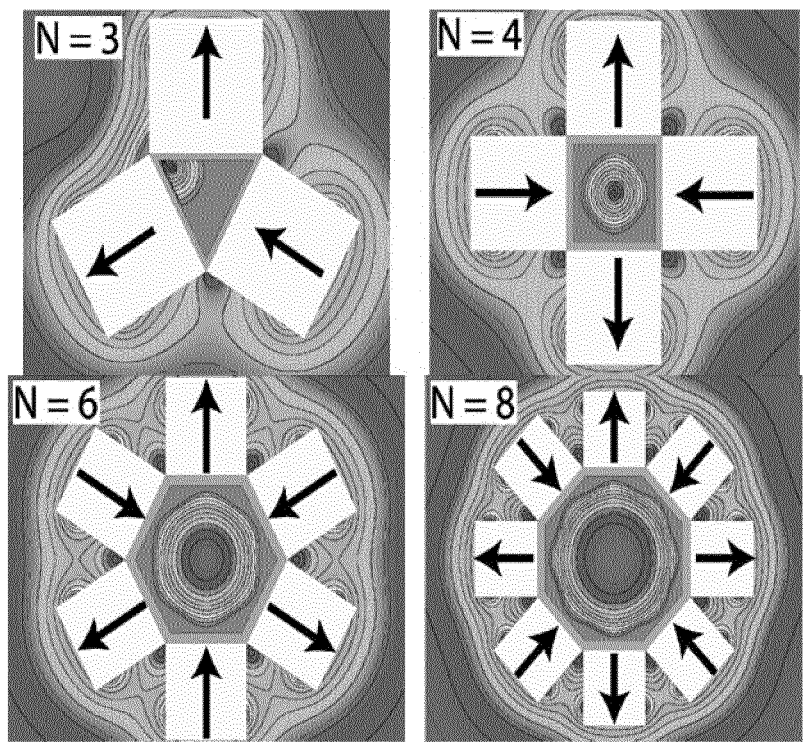

FIG. 19 represents a crossectional magnetic field magnitude distribution |B| for four multipolar geometries, N=3, 4, 6, 8; ($\delta$=1, t=1), from 0-0.5 Tesla (T).

Figure 20:
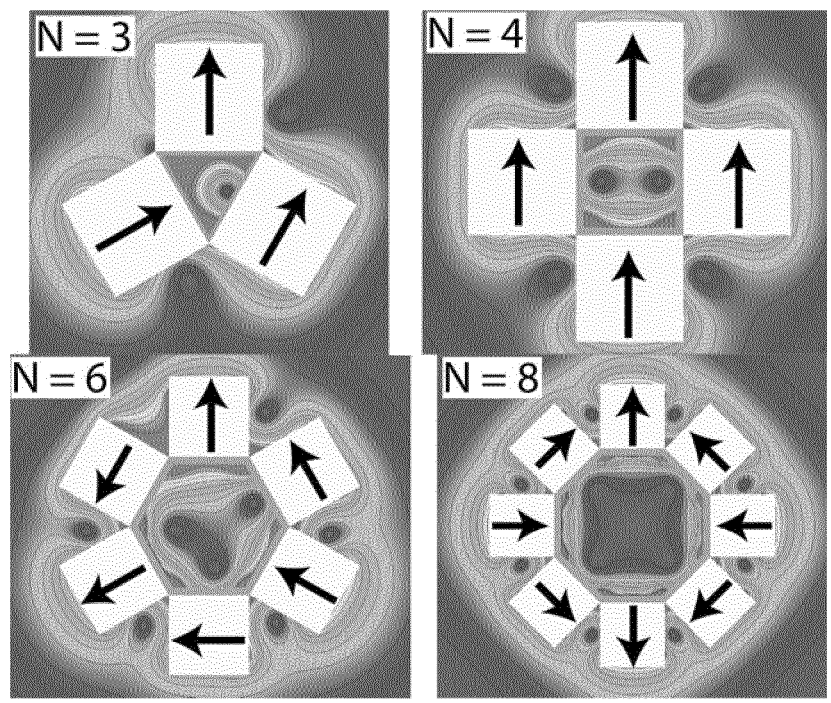

FIG. 20 represents a crossectional magnetic field magnitude distribution |B| for four multipolar geometries, N=3, 4, 6, 8; ($\delta$=1, t=1), from 0-0.5 Tesla (T).

Figure 21:
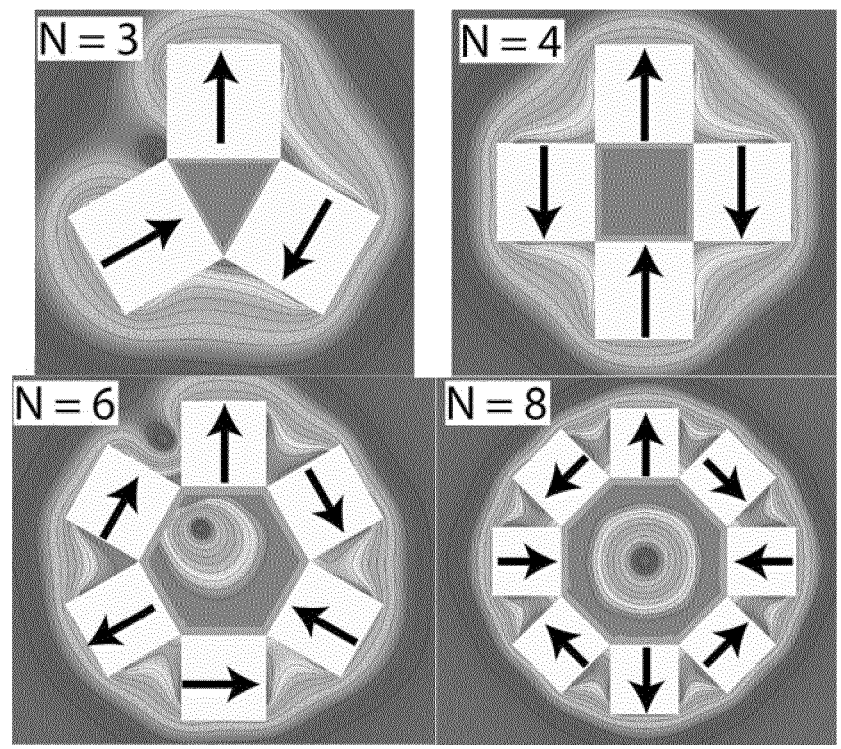

FIG. 21 represents a crossectional magnetic field magnitude distribution |B| for four multipolar geometries, N=3, 4, 6, 8; ($\delta$=1, t=−1), from 0-0.5 Tesla (T).

The permanent magnets may be made from NdFeB, SmCo, alnico or hexagonal ferrite, the said material in sintered or bonded form.

Figure 22:
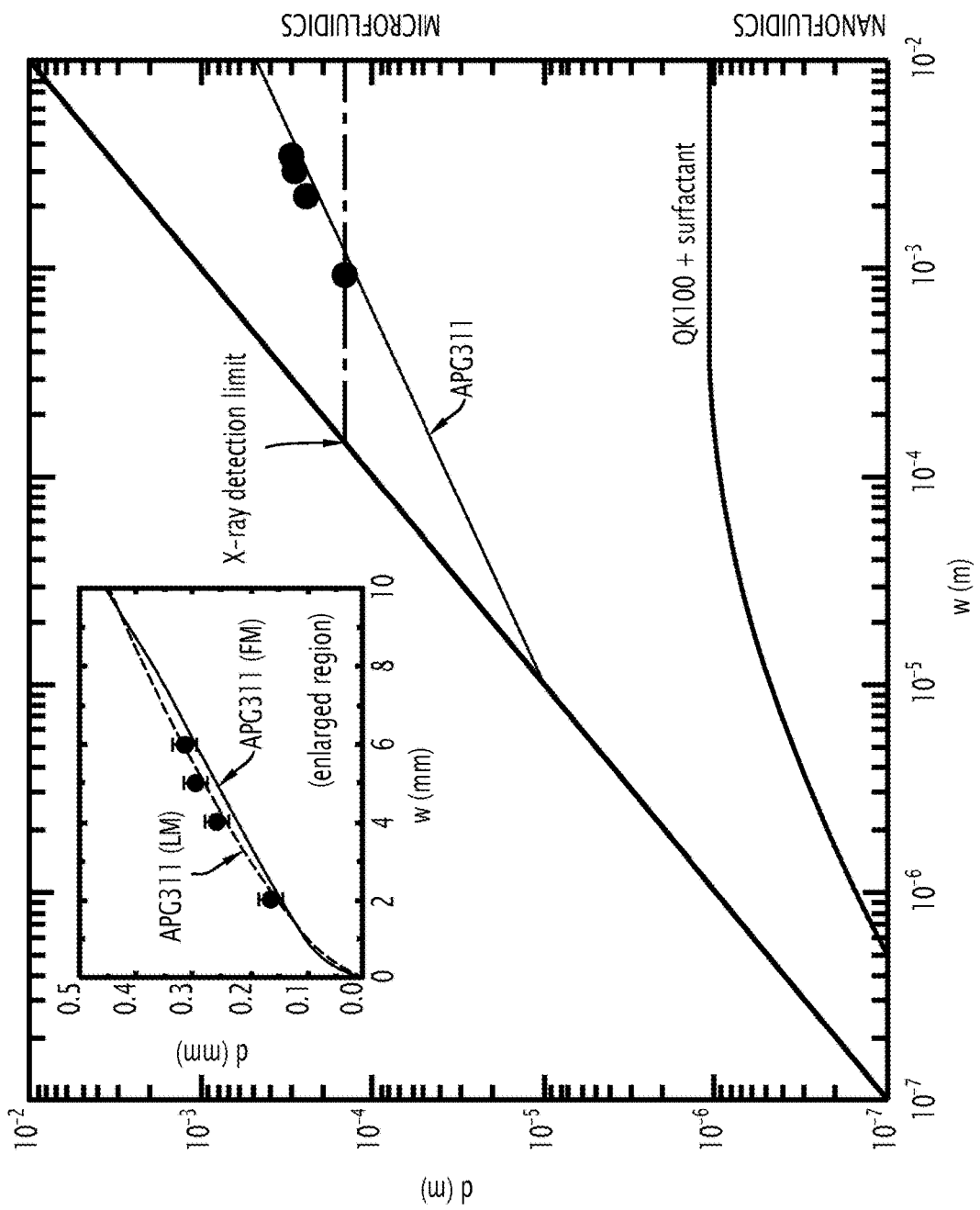

FIG. 22 represents a graph of water antitube diameter d versus gap width w. The graph is a simulation. Points are experimental data on the curve "APG311" (Ferrotec). The curve "QK100+surfactant" is obtained with a very strong ferrofluid (QK100 with $M_s$ of 100 kA m$^{-1}$, Qfluidics) and where the surface tension σ is lowered to 1 mN m$^{-1}$ using surfactants (e.g., Tween-20 and Span-80). The inset shows an enlarged area for APG311 data points and error bars from at least three independent experiments.

Figure 23:
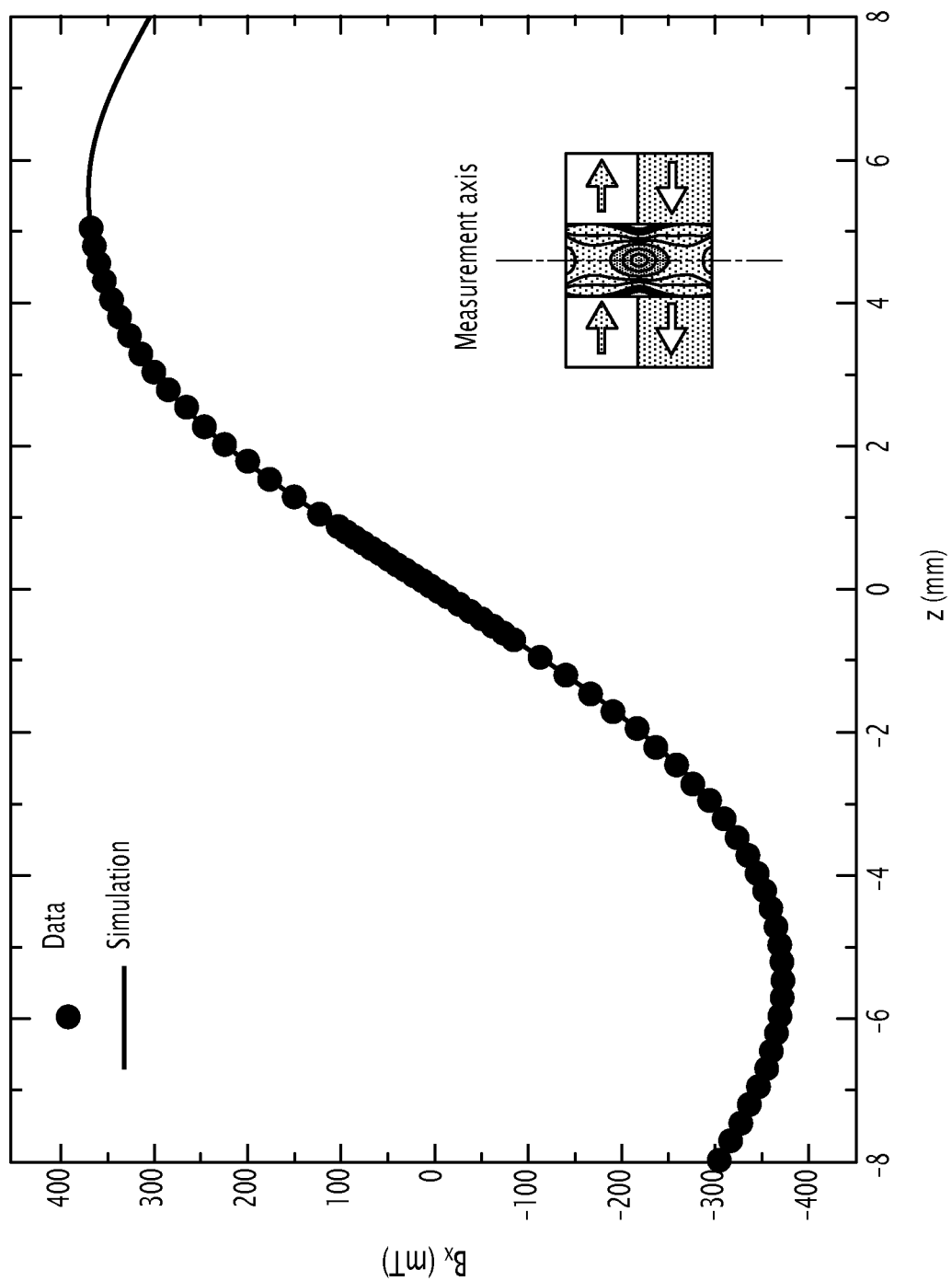

FIG. 23 represents a graph showing the Null Point of a Quadrupolar Magnet (Magnets used: 9×9×50 mm bars, gap of 9 mm). The measure is performed along the central axis the direction of the magnetic field switches, meaning there is a true null or zero point as shown in FIG. 23. In FIG. 23: Vertical Field Profile. x component of the magnetic field measured along z. Inset shows the measurement axis.

EXAMPLES

Example 1—Aqueous/Aqueous Liquid Anti-Tubes

A range of different magnet arrangements have been used to stabilize paramagnetic liquid anti-tubes (i.e., a tube of a diamagnetic liquid within a paramagnetic fluid). The paramagnetic liquid in this section is made by dissolving holmium chloride (HoCl$_3$) in water, whereas the diamagnetic (less paramagnetic) liquid is pure water. In all cases small commercially available NdFeB magnets were used to fabricate the magnet arrangements and the tube was visualized by confocal microscopy (using Rhodamine B as a dye). For each of four magnet arrangements MA1-4 the following three types of information are shown in FIG. 1.

Figure 1:
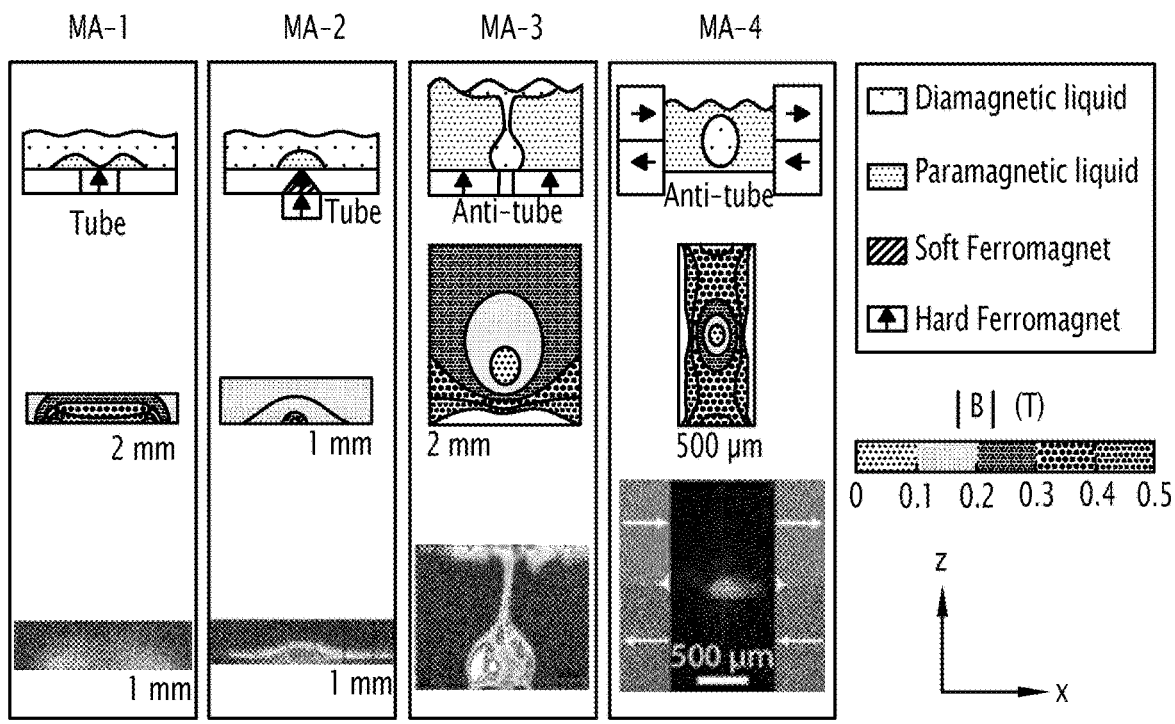
FIG. 1 represents Geometries, simulations, and experimental verification of liquid tubes and anti-tubes according to example 1.

In FIG. 1:

a) Schematic of liquid tube and anti-tube confinement for four magnet arrangements, the first two stabilize tubes of paramagnetic HoCl$_3$ in water, the last two stabilize anti-tubes of water or LaCl$_3$ in HoCl$_3$; b) analytically evaluated contour plots of |B| for the geometries; c) confocal cross-section fluorescence images of rhodamine in tubes (columns 1,2), and anti-tubes (columns 3,4).

The first magnet arrangement MA-1 is a rectangular magnet magnetized vertically. When the paramagnetic liquid is flowed close to the magnet, a tube forms with a bimodal height profile across its cross-section. In order to avoid the bimodal shape, a flux-concentrator (fabricated from a soft ferromagnetic material) was used (MA-2). Of particular interest for applications in microfluidics is the anti-tube, where no magnetic species need be present in the main channel. The easiest implementation is MA-3, where a narrow notch is cut or etched in a NdFeB permanent magnet. The notch effectively creates a magnetic void in the surface magnetic field (FIG. 1b, MA-3), which leads to an anti-tube at the b substrate (FIG. 1c, MA-3). However, the anti-tube stabilization is weak in the vertical direction, leading to a plume of ascending (diamagnetic) water, aided by the density difference (specific gravity of HoCl$_{3,aq}$ is 1.3). The inventors discovered the arrangement providing full magnetic anti-tube confinement in all three dimensions (MA-4) which is a quadrupole arrangement. In addition, there is no physical wall contact at any point, in contrast to the other three magnet arrangements.

This example supports the manufacturing of a device according to the present invention comprising at least one circulating zone and at least one fluid comprising at least one more-paramagnetic liquid and at least one less-paramagnetic liquid forming a liquid-liquid interface, said device comprising at least one element generating, in said circulating zone, a magnetic field, wherein said less-paramagnetic liquid is surrounded by said more-paramagnetic liquid in the circulating zone. The reverse arrangement wherein said more-paramagnetic liquid is surrounded by said less-paramagnetic liquid in the circulating zone is also supported by these experiments.

Example 2—Aqueous/Oily Anti-Tubes

Figure 2:
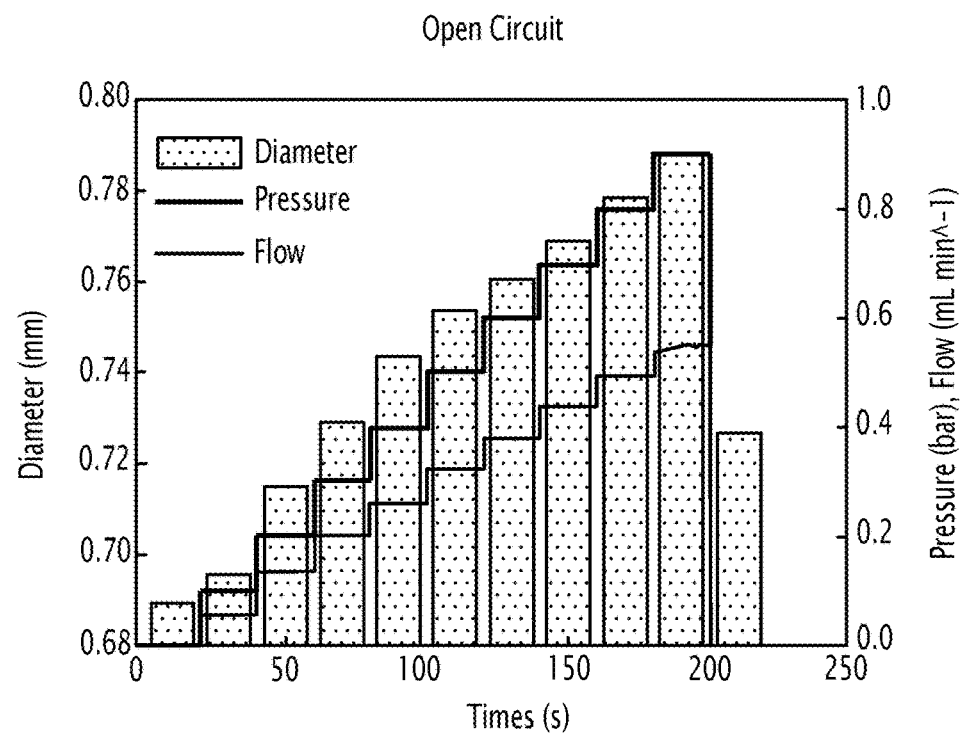
FIGS. 2 and 3 represent water in oily ferrofluid anti-tubes in a device with a quadrupole magnet.
Figure 3:
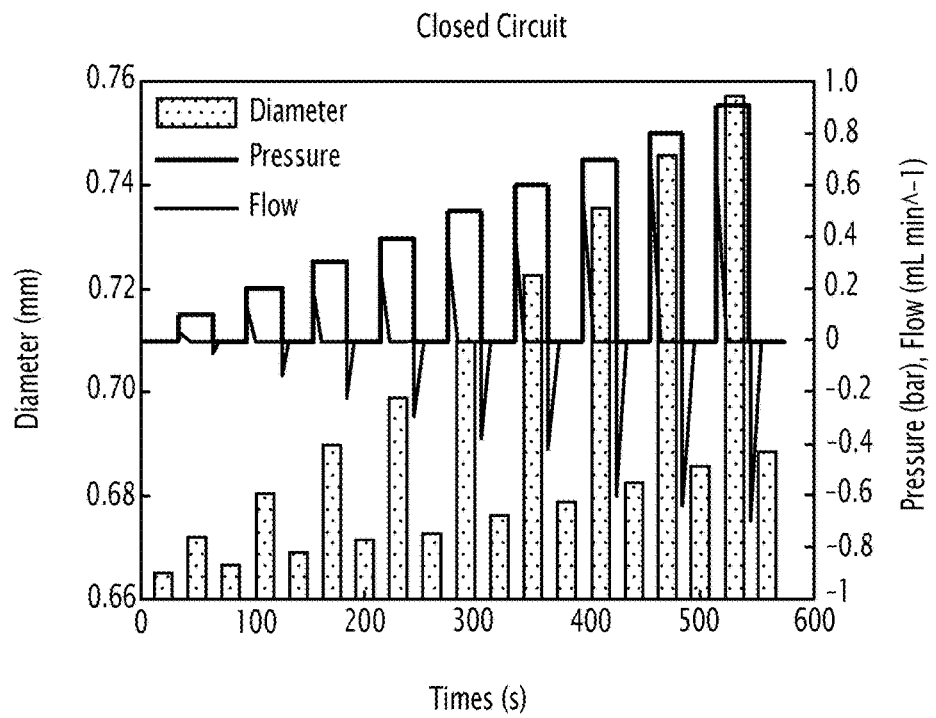

The inventors noted that anti-tubes described in example 1 have only a limited life-time when the paramagnetic liquid is an aqueous solution of paramagnetic ions and the less-paramagnetic liquid is pure diamagnetic water, due to diffusion of Ho$^{3+}$ ions across the paramagnetic/diamagnetic boundary. The ion diffusion reduces the difference in magnetic susceptibility between the two initially well-defined regions, which in turn lowers the magnetic pressure and bulk forces. However, when implementing two liquids that are immiscible by replacing the aqueous paramagnetic liquid by an (APG 300, Ferrotec) oil-based ferrofluid, any transport across the boundary was prevented, and thus leads to anti-tubes that are stable for months. The anti-tube diameter can be measured from the side-view of the device using a stereoscope in transmission mode. To characterize the behaviour of the anti-tube a series of pressure experiments was performed. Firstly, a defined pressure was applied to the inlet of the anti-tube by flowing pure water using a pressure-driven pump. The pressure induces flow through the anti-tube towards the outlet, which was measured using a mass-flow sensor. FIG. 2 shows a typical experiment, in which it is clear that an increase in pressure leads to an increase in flow, as well as a slight dilation of the anti-tube diameter. When the outlet of the anti-tube is closed off completely, there is only a transient flow into the anti-tube. The increased pressure dilates the anti-tube and accommodates more water. When the pressure is reduced again, there is a negative (reverse) flow to excrete the excess water (FIG. 3).

Example 3—Designs of Elements Generating a Magnetic Field 3.1. Quadrupole

Figure 4:
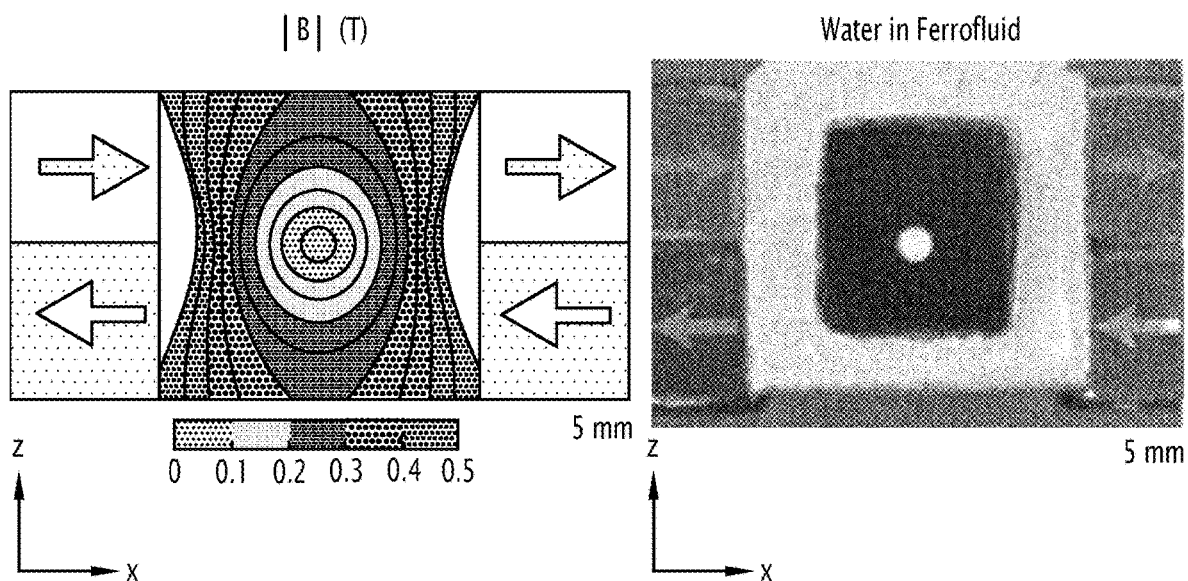
FIG. 4 represents a simulated magnetic field distribution for a quadrupolar array with gap of 12 mm. The lowest field is created in the centre of the gap between two magnets and is represented on the left; on the right is a cross-sectional view of aqueous anti-tube (white dot in the centre) confined in a commercial ferrofluid (black colour) in a 3D printed plastic holder with permanent magnets.

The inventors have designed magnetic arrays to form an anti-tube by magnetic field simulations (using either finite element methods or analytical expressions using SciPy) and prototyping (using a 3D printer). With a quadrupole magnet arrangement it is possible to achieve stable anti-tubes of virtually any diamagnetic liquid that is immiscible with the paramagnetic medium as shown in FIG. 4.

A commercial ferrofluid (black colour) was used as paramagnetic liquid and water as diamagnetic liquid. Water that was flowed through the ferrofluid remained clear and transparent further supporting the stability of the anti-tube. Water flows freely through the black oily ferrofluid without being contaminated by the paramagnetic liquid. In other words, the combination of the quadrupole magnets and the ferrofluid results in a channel with liquid walls.

3.2. Single Sided Designs

Single sided designs are suitable when buoyancy/density differences between the more diamagnetic and paramagnetic liquids are not significant as they have weaker vertical confinement.

3.2.1 Horizontally Magnetised Soft Magnets

In this configuration, soft magnetic foils are magnetised horizontally using external magnetic sources, e.g. permanent magnets in intimate contact (FIG. 7), or larger external fields. The magnetic field stays within the soft foil except where there are cuts or notches. Pairs of notches cut into a foil allow the magnetic field to escape, and lead to the formation of a stable region that contains a liquid tube (FIG. 8).

3.2.2 Horizontally Magnetised Multi-Track Hard Magnets

The same magnetic field structure as that described above can be generated using magnet sources with the same shape as the notches, but magnetised in the opposite direction (FIG. 9).

3.3. Bilayer Designs 3.3.1 Vertically Magnetised Permanent Magnets

An example of Vertically Magnetised Permanent Magnets is represented on FIG. 10

3.2.2 Horizontally Magnetised Permanent Magnets

An example of Vertically Magnetised Permanent Magnets is represented on FIG. 11.

3.2.3. Horizontally Magnetised Permanent and Soft Magnets

An example of Vertically Magnetised Permanent Magnets is represented on FIG. 12.

3.4. Dipolar Configurations 3.4.1 Vertically Magnetised Permanent Magnets

An example of Vertically Magnetised Permanent Magnets is represented on FIG. 13.

An second example of Vertically Magnetised Permanent Magnets is represented on FIG. 14.

3.4.2. Horizontally Magnetised Permanent Magnets

An example of Horizontally Magnetised Permanent Magnets is represented on FIG. 15.

An example of Horizontally Magnetised Permanent Magnets is represented on FIG. 16.

3.5. Symmetric Multipolar Configurations

Multipolar configurations, with N magnets can include, but are not limited to variations of magnetisations where the $k^{th}$ magnet in polar coordinates has a magnetisation:

$$M_\theta = M \cos(2\pi k/N + (\delta + tk)2\pi/s)i^{2k|t|} \quad (1)$$

$$M_r = M \sin(2\pi k/N + (\delta + tk)\pi/s)i^{2k|t|} \quad (2)$$

where $i=\sqrt{-1}$. Simple examples given below are for $s=4$, i.e. where the magnetisation of a magnet can be one of four orientations, radial positive ("outwards"), radial negative ("inwards"), transverse positive ("right"), and transverse negative ("left"). Scales in the following sections are from 0-0.5 T.

3.5.1 Pointing radially outwards ($\delta=1$, $t=0$)

$$M_\theta = M \cos(2k\pi/N + \pi/2) \quad (3)$$

$$M_r = M \sin(2k\pi/N + \pi/2) \quad (4)$$

An example of a Multipolar Configuration of Permanent Magnets is represented on FIG. 17.

3.5.2. Alternating transverse (right, left) ($\delta=0$, $t=0$)

$$M_\theta = M \cos(2k\pi/N) \quad (5)$$

$$M_r = M \sin(2k\pi/N) \quad (6)$$

An example of a Multipolar Configuration of Permanent Magnets is represented on FIG. 18.

3.5.3. Alternating radially outwards, inwards ($\delta=1$, $t=1$)

$$M_\theta = M \cos(2k\pi/N + \pi/2)i^{2k} \quad (7)$$

$$M_r = M \sin(2k\pi/N + \pi/2)i^{2k} \quad (8)$$

An example of a Multipolar Configuration of Permanent Magnets is represented on FIG. 19.

3.5.4. Alternating radially out, transverse left, radially in, transverse right ($\delta=1$, $t=1$)

$$M_\theta = M \cos(2k\pi/N + (1+k)\pi/2)i^{2k} \quad (9)$$

$$M_r = M \sin(2k\pi/N + (1+k)\pi/2)i^{2k} \quad (10)$$

An example of a Multipolar Configuration of Permanent Magnets is represented on FIG. 20.

3.5.5. Alternating radially out, transverse right, radially in, transverse left ($\delta=1$, $t=-1$)

$$M_\theta = M \cos(2k\pi/N + (1-k)\pi/2)i^{2k} \quad (11)$$

$$M_r = M \sin(2k\pi/N + (1-k)\pi/2)i^{2k} \quad (12)$$

An example of a Multipolar Configuration of Permanent Magnets is represented on FIG. 21.

Example 4—Magnetically Actuated Valve

The addition of another magnet affects the magnetic field gradient created by a quadrupole arrangement of permanent magnets. An additional permanent magnet was placed near the exit port of a fluidic device that had water running through; it created a pinch point within an anti-tube and stopped the flow of water.

The device according to the invention may work as a magnetically actuated valve.

Example 5—Magnetically Actuated Peristaltic Pump

A traveling wave inside the quadrupole device was created. The zero magnetic field point in the centre of the quadrupole is disrupted by the external (non-quadrupole) magnet, and by moving the magnet along the quadrupole a restriction point is created that effectively moves liquid. To this end, a wheel with 10 permanent magnets was placed around it (FIG. 5) with the wheel rotating on the top of a fluidic device.

One fluidic opening of the device comprising the quadrupole was immersed in a reservoir of water. When the wheel was rotated, it was observed that water flowed through the anti-tube and came out of the exit port of the fluidic device. While the wheel was running, water kept flowing through the anti-tube. However, water immediately stopped flowing when the rotation of the wheel stopped.

These experiments demonstrate that pumping can be achieved using magnetic pinching of a quadrupolar field.

Example 6—Life Science Applications

Blood is one of the most difficult liquids to handle as it easily causes clogging of tubes and red blood cell rupture by shearing (haemolysis). A TMB (3,3',5,5'-Tetramethylbenzidine) immunoassay was used to characterize the residual blood remaining in an anti-tube manufactured according to the invention, with a design similar to the quadrupole of example 3.

After the circulation of blood, TMB substrate solution was used to rinse the anti-tube made by the diamagnetic liquid. As the TMB assay produces a chromogenic substrate solution, the colour of the solution was used to quantify the amount of blood remaining. As references, the fouling-properties of commercial Tygon tubes (regular and medical grade) were characterized. Regular Tygon tubes showed permanent adhesion of blood inside the tube (FIG. 6, note that triangles do not return to zero even after flushing many tube volumes). Remarkably, the result of the ferrofluid anti-tube of the invention was at same level as a medical grade Tygon tube.

Example 7—Estimation of Tube Diameter

FIG. 22 shows how the antitube diameter d changes with the dimensions of the magnetic flux source and the type of confining fluid. Good agreement is found between the experimental points for water antitubes and the predictions of Equations (1) and (2), using measured magnetization and interface energy. For ferrofluid tubes larger than 150 μm in ferrofluids, X-ray imaging can be used, while optical imaging of smaller tubes is possible for some fluids.

Miniaturization of the channels is possible thanks to an attractive feature of permanent magnets, namely that the fields they produce are independent of length scale l. Hence H, M and the magnetic energy density do not depend on channel size. The interface energy σ however scales as $l^{-1}$; with an oil/water interface energy of 23 mJ m$^{-2}$, a field of 100 mT and a susceptibility of 1, the antitube will become unstable below a diameter of 5 μm. Further miniaturization would require σ to be reduced. By combining a very strong ferrofluid (QK100 with a magnetisation of 100 kA m$^{-1}$ in a hydrocarbon medium) and a double surfactant (e.g., Span-80 in the ferrofluid, and Tween-20 in the aqueous antitube), we estimate that antitube diameters of ~100 nm could ultimately be achieved. Such nanometer-sized antitubes would allow practical nanofluidic devices to be realized.

Example 8—Mixing Fluids

Mixing of flow was demonstrated in a ferrofluid antitube Y-junction, which symmetrically split the flow. A less-paramagnetic fluid flowed through one branch of the Y-junction, a more-paramagnetic fluid flowed through the other branch of the Y-junction and fluids mixed in the third branch of the Y-junction.

Merging of liquid at a Y-junction was visualized using antitubes stabilized by a ferrofluid. Remarkably, mixing occurs immediately after the Y-junction due to the Kelvin-Helmholz instability. This is in striking contrast to the laminar flow observed in a 3D printed microfluidic chip with the same channel size and geometry as the antitube.

The invention claimed is:

1. A device comprising at least one circulating zone and at least one fluid comprising at least one more-paramagnetic liquid and at least one less-paramagnetic liquid forming a liquid-liquid interface, said device comprising at least one element generating, in said circulating zone, a magnetic field, wherein said less-paramagnetic liquid is surrounded by said more-paramagnetic liquid in the circulating zone, said less-paramagnetic liquid circulating in the more-paramagnetic liquid and forming a tube in said more-paramagnetic liquid, the magnetic field being theoretically null along the central axis of the tube, and wherein said less-paramagnetic liquid circulates in said circulating zone without contact with a solid wall.

2. The device according to claim 1, wherein said element generating the magnetic field is selected from the group consisting of permanent or electropermanent magnets, electromagnets, magnetised soft magnets, and any combination thereof, where additionally, the field strength and/or orientation can be time dependent.

3. The device according to claim 1, wherein said device comprises a multipolar configuration of N magnets with N equal or greater than 2 or equal or greater than 3, N representing the number of magnets.

4. The device according to claim 1, wherein said elements generating the magnetic field comprises a quadrupole.

5. The device according to claim 1, wherein said device is a microfluidic device, a magnetically actuated fluid valve, a magnetically actuated peristaltic pump, an anti-fouling device, an anti-clogging device, a propulsion device, a heat exchanger, an extractor, a desalinator, or a mixing device.

6. The device according to claim 1, wherein said device provides a liquid-in-liquid flow, and comprises a movable pinching point in at least one circulating zone, said movable pinching point moving in the liquid-in-liquid flow direction to circulate said fluid in at least one circulating zone.

7. The device according to claim 1, wherein said device comprises an undulated liquid-liquid interface due to normal-field instabilities creating undulations, where said undulations can move in the liquid flow direction to circulate said fluid in at least one circulating zone.

8. The device according to claim 1, wherein said less-paramagnetic liquid is a diamagnetic liquid.

9. The device according to claim 1, wherein said less-paramagnetic liquid is a biological fluid or a fluid including a suspension of biological cells in a liquid medium.

10. The device according to claim 1, wherein said device comprises an organic paramagnetic liquid.

11. A method comprising circulating at least one less-paramagnetic liquid inside one or more more-paramagnetic liquids,
wherein the at least one less-paramagnetic liquid circulates inside at least one circulating zones without contact with a solid wall of a device comprising the at least one circulating zone and the at least one more-paramagnetic liquid in said at least one circulating zone,
said device comprising at least one element generating, in said at least one circulating zone, a magnetic field, said at least one less-paramagnetic liquid circulating in said at least one circulating zone comprising said at least one more-paramagnetic liquid, thereby forming a liquid-liquid interface wherein said at least one less-paramagnetic liquid is surrounded by said at least one more-paramagnetic liquid in the at least one circulating zone and forms a tube in said at least one more-paramagnetic liquid, wherein the magnetic field being theoretically null along the central axis of the tube.

12. The method according to claim 11, wherein said at least one element generating a variation in the magnetic field thereby circulating the at least one paramagnetic liquid in the at least one circulating zone in the circulating zone.

13. The method according to claim 2, wherein the field strength and/or orientation is time dependent by means of mechanical actuation and/or rotation of permanent magnets or by increasing and/or decreasing the current in an electromagnet.

* * * * *